Oct. 6, 1931.   E. A. THOMPSON   1,826,682
TRANSMISSION
Original Filed Aug. 2, 1926   2 Sheets-Sheet 1

Inventor
Earl A. Thompson

By Blackmore, Spencer & Hulse
Attorneys

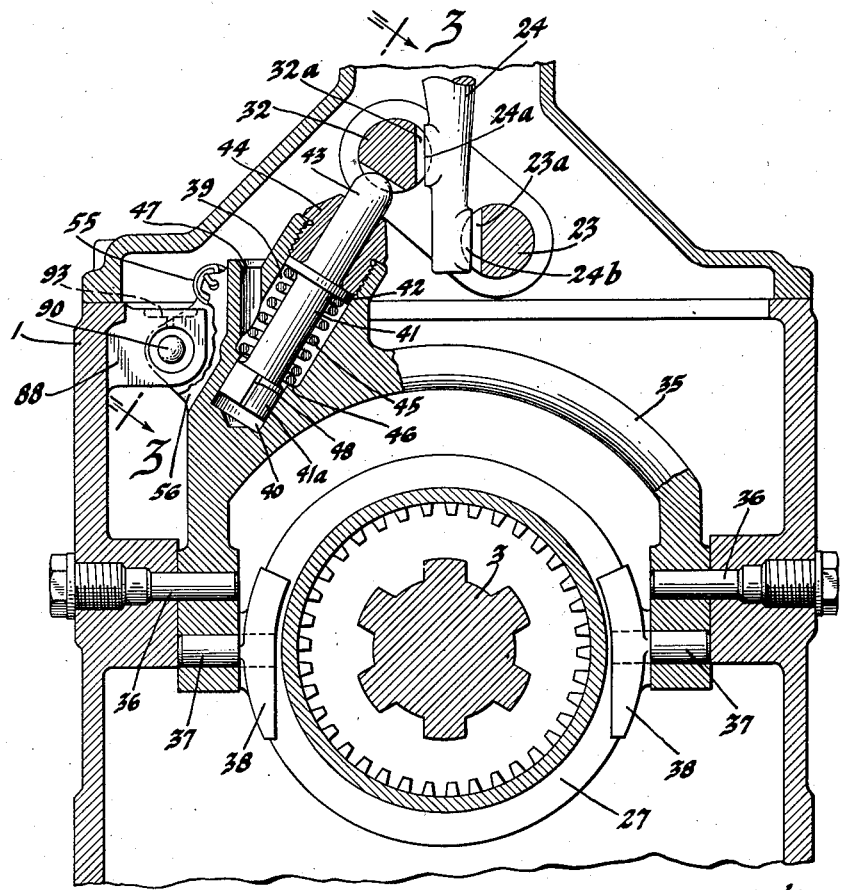
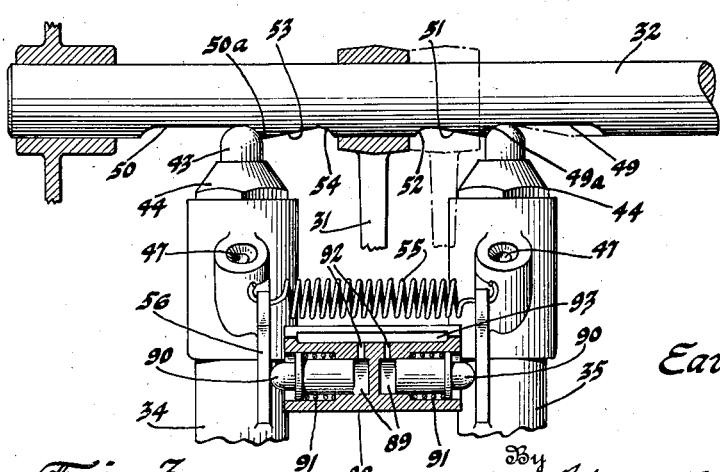

Patented Oct. 6, 1931

1,826,682

UNITED STATES PATENT OFFICE

EARL A. THOMPSON, OF BIRMINGHAM, MICHIGAN, ASSIGNOR TO GENERAL MOTORS CORPORATION, OF DETROIT, MICHIGAN, A CORPORATION OF DELAWARE

TRANSMISSION

Original application filed August 2, 1926, Serial No. 126,639. Divided and this application filed April 13, 1931. Serial No. 529,700.

This invention relates to power transmission mechanisms,—particularly for motor vehicles,—including plural trains of toothed gears adapted to be coupled selectively, whereby the number of revolutions of the power output shaft with respect to those of the power input shaft may be varied step by step.

The difficulties incident to changing from one train of gears to another, in transmissions of this type, unless the gears or other toothed elements to be intermeshed are first caused to rotate at substantially equal speeds are well known. A geared change speed transmission for motor vehicles equipped with means for pre-equalizing tooth speeds of elements to be intermeshed is disclosed and claimed in my application Serial No. 126,639, filed August 2, 1926; this application is a division thereof.

In this application there are shown and described, as in the parent application, a motor vehicle transmission including four trains, by proper selection among which the output shaft may be rotated relatively to the input shaft in the same direction (forward) at any one of three different speeds, and in the reverse direction at one speed.

I have applied means, herein termed synchronizing devices, adapted to bring the toothed elements of high and second speed trains, only, to approximately the same tooth speed before intermeshing them. Low speed and reverse trains are used less frequently than high and second, and are normally coupled when the car is standing still. Therefore there is no practical need for synchronizing devices associated with low and reverse trains.

Second speed spline shaft (output shaft) gear, in accordance with my invention, is in constant mesh with its coacting countershaft gear and is provided with clutch teeth whereby said gear is adapted to be locked to the spline shaft by a selective slidable double ended jaw clutch or coupling element when the latter is moved rearward to transmit the power of the engine in second speed. When the sliding jaw clutch element is moved forward its front end teeth mesh with the teeth or jaws of a coacting clutch element on the input shaft and thus locks the input shaft to the spline shaft to afford a direct high speed drive. The synchronizing devices are moved to bring about synchronous speeds of the jaw elements to be engaged prior to intermeshing. By reason of the use of jaw clutches selectively operated instead of slidingly intermeshable gears for the high and second speed trains, axial movement of the intermeshable elements need be less than is considered necessary in intermeshing slidable gears directly. The axial movement necessary to engage and disengage the conical friction clutch parts here utilized as synchronizing devices need also be much less than is needed to shift sliding gears into and out of mesh. Also a relatively large force is required to press together the friction synchronizing devices strongly enough to effect synchronization in the brief time permitted for this in the shifting operation.

First, or low, and reverse trains are selected according to this invention by sliding a gear axially on the spline shaft into and out of mesh with coacting low speed counter shaft gear or reverse idler. The axial movement of the slidable gear is greater than that of the coupling element for selecting high and second speeds, and requires a lesser amount of force than is necessary to effect synchronization of high and second speed trains.

In accordance with this invention also the several trains are selected and intermeshed by a shift lever which is operated precisely in the manner customary with ordinary sliding gear transmissions. The shift lever is moved in the usual manner to interlock with one slide for shifting to high or second, and to interlock with another slide for shifting to low or reverse. The handle of the shift lever has substantially the same amplitude of movement in making all shifts, but operates with a higher mechanical advantage in coupling the two trains that include the synchronizing devices than in coupling the other two including the gears that are directly coupled by sliding one into mesh with another. Thus the operator, by exerting the same amount of force upon the handle of the shift lever and giving it the same amplitude of movement may apply the relatively large force and shorter movement to one slide required to synchronize high and second speeds, or the relatively small force and longer movement to the other slide for shifting the slidable gear to couple the trains not provided with synchronizing devices. This construction and disposition of the gear trains and controls is of distinct advantage, because the changes of speed may be effected by the driver without the disconcertion likely to result from having to apply greater, (and perhaps inadequate) force, in making the shifts into high and second than into low and reverse; or from having to move the shift lever handle through a greater arc in some shifts than in others. Variations in length of shift lever handle movements are awkward also because of the limited space in front of the driver's seat of the usual motor vehicle within which the shift lever moves.

In the accompanying drawings in which like reference characters are used to indicate like parts throughout the several views:

Fig. 2 is a transverse sectional view, and

Fig. 3 is a view partly in section on a plane indicated by line 3—3 Fig. 2 of a means for causing engagement of the synchronizing elements.

Figure 1:
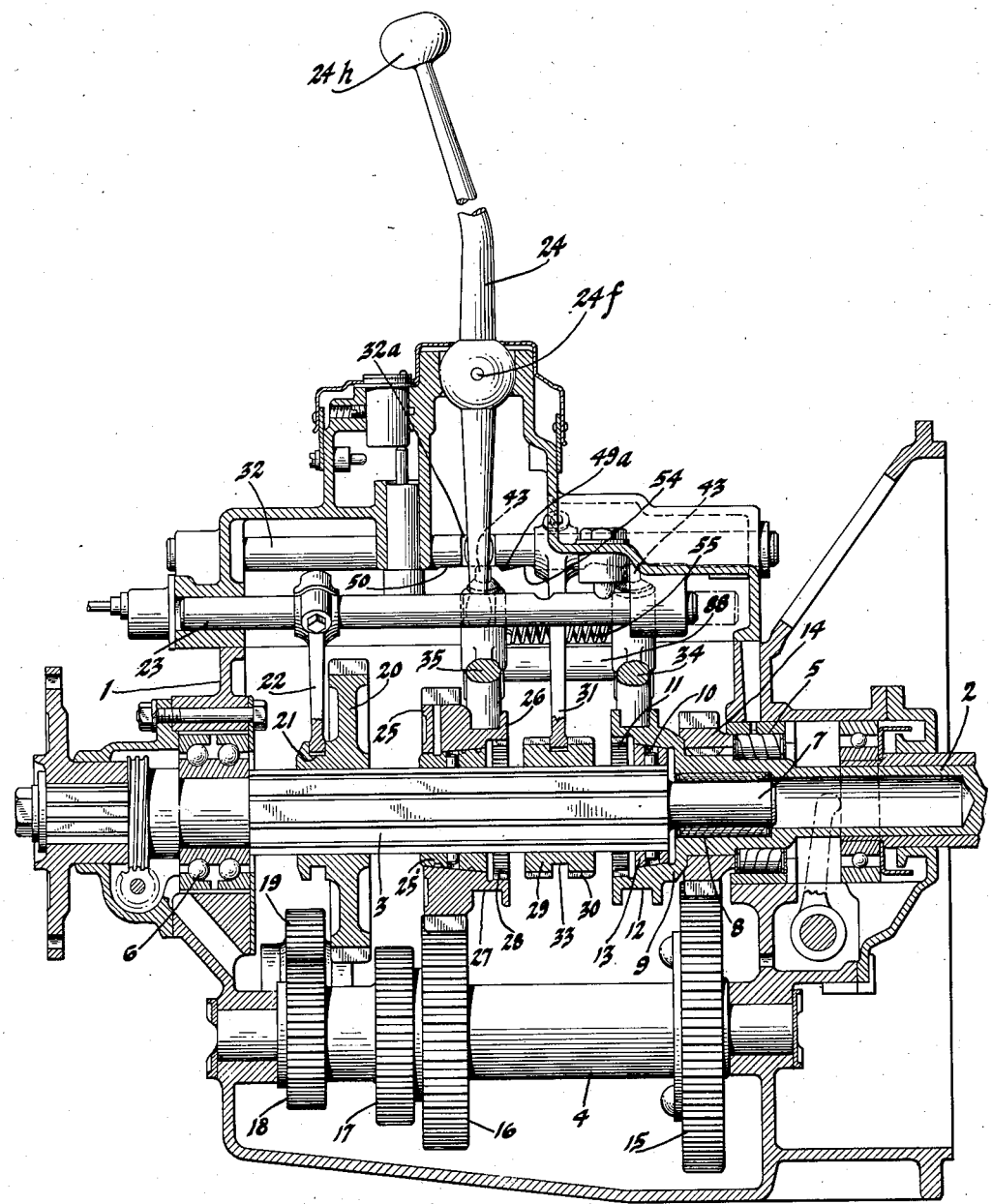
Fig. 1 is a longitudinal sectional view of a gear transmission embodying this invention.

In said drawings numeral 1 indicates the gear box or usual housing of a motor vehicle transmission, 2 the clutch shaft, constituting the power input shaft, 3 the usual spline shaft, constituting the power output or driven shaft, and 4 the usual counter shaft. Clutch shaft 2 is supported and rotates in roller bearing 5 at the power input end of the housing and driven shaft 3 in ball bearings 6 at the rear or power output end of the housing. The forward end of driven shaft 3 is reduced as shown at 7 and piloted in roller bearings 8 within a bore in clutch shaft 2. Clutch shaft 2 terminates rearward in a hollowed enlargement 9 which surrounds the forward ends of the splines on shaft 3, and is provided interiorly with a conical friction-surfaced recess 10 and with an annular row of interior clutch teeth 11 just rearward of the conical clutch surface. Enlarged part 9 is formed exteriorly with the groove 12 for a purpose that will appear presently. Rigidly secured to spline shaft 3 within the conical recess 10 is an externally conical member 13 the surface of which is normally free of the internal conical surface of the recessed member; but shaft 2 is longitudinally slidable, as hereinafter described, so as to effect a frictional engagement between said two conical surfaces whereby to couple frictionally shafts 2 and 3.

A gear 14 rotated by shaft 2 meshes with gear 15 rigid with counter shaft 4. Gears 16, 17 and 18 are also rigid with the counter shaft, gear 18 meshing with reverse idler 19. Gear 20, splined slidably on shaft 3, may be slid into mesh with gear 17 to couple the low speed train or into mesh with idler 19 to couple the reverse speed train. A hub formed on gear 20 is provided with a groove as at 21 engaged by a shifter fork 22 carried by a slidable member such as shifter rod 23. Shifter rod 23 may be moved longitudinally by shift lever 24 in the manner usual in conventional automobile transmissions.

Gear 25 is normally loose upon shaft 3 and remains constantly in mesh with countershaft gear 16. If locked to shaft 3 second or intermediate speed train is operative. A conical bearing and clutch member 25' rigid with shaft 3 affords a bearing surface for said gear 25 to rotate upon or an element of a friction clutch to cooperate with said gear. A hub like hollow extension 26 rigid with gear 25 is provided exteriorly with a groove 27 and interiorly with a row of clutch teeth 28.

Gear 25 may be locked to shaft 3 by a slidable coupling or clutch member 29, which is provided with an external annular groove 33 and external teeth 30 on each end or on opposite sides of the groove. If coupling 29 be moved forward, or to the right as shown in Fig. 1, the teeth 30 may be meshed with the teeth 11 rigid with shaft 2 and thereby lock shafts 2 and 3 to rotate in unison; if moved rearward or to the left of Fig. 1, teeth 30 may be meshed with teeth 28 rigid with gear 25 and thereby lock gear 25 to shaft 3. A forked arm 31 carried by shifter rod 32 engages in groove 33 and slides coupling 29 in one direction or the other as the slide or shifter rod 32 is moved. Shifter rod 32 may be moved by shift lever 24, which may be interlocked at will with either shift rod 23 or 32, according to whether it is desired to couple low or reverse trains on the one hand or, on the other hand, high or intermediate.

Before coupling member 29 interlocks with either the coacting toothed elements of shaft 2 or gear 25 to positively couple, in the former case shafts 2 and 3, and in the latter gear 25 and shaft 3, said shafts 2 and 3, or said gear 25 and shaft 3 are first frictionally coupled by engagement of the friction members described, in order to bring the parts to be later positively coupled to synchronous speeds. To accomplish the frictional coupling, yokes 34 and 35 are provided to move axially, respectively, the shaft 2 to an extent sufficient to effect engagement of the internal conical surface 10 with the external conical surface of the member 13, and the gear 25 sufficiently to effect a frictional driving engagement with the member 25'. As the two yokes and cooperating elements are similar a description of one will suffice for both.

Each yoke comprises two limbs pivotally mounted on oppositely disposed fulcrum pins 36, shown in Fig. 2 in connection with yoke 35. The fulcrum pins are inserted through holes in the sides of the housing 1 which is strengthened at these points by bosses. The pins may be secured in any suitable manner but are shown held by screw threads and a suitable locking washer. Said yokes may be rocked on their fulcrum pins in one direction by movement of shifter rod 32 and in the opposite direction by one or more springs. The limbs of the yokes project below the fulcrum pins to form the work arms which support thrust pins 37 carrying, pivotally, thrust blocks 38. The blocks 38 on yoke 35 are disposed in the circumferential groove 27 of gear 25, while those on yoke 34 are disposed in circumferential groove 12 of the enlarged end portion of shaft 2.

The yokes illustrated constitute levers of the first order having power arms much longer than their work arms and therefore operate the friction clutches with very considerable mechanical advantage. The means whereby sliding of shifter rod 32 operates the yokes will be described first with respect to one of them. Fig. 2 illustrates with respect to yoke 35 a drilled and counter bored recess the lower end of which is reduced in diameter and receives a piston 41a on the lower end of plunger 41, dividing the recess into chamber 39 above the piston and chamber 40 below it. A small groove 48 in the side of piston 41a forms a restricted communication between the two chambers. The outer or upper end of the recess is threaded to receive a threaded cap 44 having an axially extending orifice which guides an extension 43 of said plunger, the preferably semi-spherical end of which is adapted to yieldably engage or interlock with suitable shoulders on shift rod 32. Plunger 41 is also provided with a flange 42 which may engage the inner end of cap 44 and thereby limit the extent of movement of the plunger outward. A coil compression spring 45 within the bore exerts pressure between the shoulder 46 of the counter bore of the recess, and said flange 42, thus tending to keep the end of extension 43 pressed against the shift rod 32. A passage 47 having a flaring outer end communicates between chamber 39 and the space within the housing. Oil may be introduced through the passage 47 into the chamber 39 whence it will flow through the groove 48 into chamber 40. When the chamber 40 is filled with oil the described mechanism functions as a liquid brake or dash pot. The chamber is kept filled with oil during operation by the splash from the moving mechanism within the housing.

Shift rod 32, as most plainly shown in Fig. 3, is provided with spaced apart longitudinally elongated recesses 49 and 50 each having a plane surface terminating at the end nearest the other recess in a shoulder 49a, 50a, respectively, each shoulder merging into the plane surface in a curve preferably formed on a radius equal to the radius of the semi-spherical end of a plunger extension 43. Shifter arm 31 is secured to rod 32 midway between said shoulders 49a and 50a. Extending from shoulder 49a toward the shifter arm 32 is an inclined surface 51, terminating in a rounded recess. A like inclined surface 53 extends from shoulder 50a toward the shifter arm and terminates in recess 54.

A contractile coil spring 55 exerts its elasticity to urge the yokes 34 and 35 toward one another. The ends of the spring are attached to stop flanges 56 which coact with cushioned stops 90, carried by a bracket 88 on the housing. Bracket 88 is counterbored on opposite sides to form opposed cylinder bores 89. Stops 90 constitute pistons sliding in the bore which are elastically positioned by springs 91. Holes 92 connect the cylinder bores 89, with a pan-like depression 93 in the upper face of bracket 88. The splash of oil occurring during operation keeps the pan and cylinder bores supplied with oil. Thus stops 90 act as fluid brakes to cushion and silence the impact of either of the yokes 34 or 35.

As illustrated in the drawings the construction and relative arrangement of the movable clutches and gears of the transmission assembly, the shifter rods and the shifter lever, are such that the amplitude of movement of the movable elements of the selective clutches associated with the high and second speed gear trains necessary to couple them is less than the amplitude of movement necessary to couple the low speed and reverse trains; consequently the amplitude of movement of shifter rod 32, by which coupling member 29 and associated movable friction clutch elements are moved, needs to be less than that of shifter rod 23 by which sliding gear 20 is moved. Furthermore, a larger force is required to shift into high and second than to shift into low and reverse because of the necessity of forcing the friction clutch elements into driving engagement adequate to insure synchronization within the brief period of time permitted for shifting. The lesser amplitude of movement and greater force necessary in shifting to high and second speed trains is obtained by means of the construction and arrangement shown. Reference to Figs. 1 and 2 shows that shifter rods 32 and 23 are provided, respectively, with notches 32a and 23a adapted to interlock with suitable formations 24a and 24b on the shifter lever 24. The formation 24a is nearer the fulcrum 24f of the shifter lever than is the formation 24b whereby a greater mechanical advantage is obtainable for synchronizing purposes. The proportions and disposition of the parts operated by the shifter lever 24 are such that the range of movement of the handle 24h of said lever is approximately the same for all shifts, and the mechanical advantage applicable to shift rod 32 enables a greater force to be applied in synchronizing and coupling the elements of high and second speed trains than in coupling low and reverse without any greater movement of the handle or the exercise of greater muscular effort by the operator. It will be understood that the shift lever 24 is manipulated by the operator in the manner usual in conventional sliding gear variable speed transmissions. A fixed notched rail, or equivalent, (not shown) of any usual form is arranged to have its notch register with the notches 23a and 32a of the shifter rods when all trains are uncoupled, the lower end of shifter lever 24 may then engage in the notch of the fixed rail (neutral position). In this condition none of the trains can be coupled as they are locked in neutral. By moving the lower end of shifter lever to the left (Fig. 2) shifter rod 32 may be interlocked with the shift lever so that either the high or second speed trains can be coupled or by moving said lever in the opposite direction it may be interlocked with shifter rod 23 so that low or reverse trains may be coupled.

In the drawings the parts are shown in neutral position. To shift into "low" speed or into "reverse" gear the gear 20 is operated from the shifter rod 23 in the usual manner. When it is desired to shift into "second" gear the shift lever 24 is operated to move the shifter rod 32 to the right as shown in Fig. 3 and to the left as shown in Fig. 1, this movement of the shifter rod causing shoulder 49a at that end of the recess 49 adjacent the beveled surface 51 to engage the upper end of the extension 43 of the plunger 41 and rock the yoke 35 so that the thrust blocks 38 will force the gear 25 into tight frictional engagement with the conical member 25′ so that the gear will rotate with the conical member and establish a synchonized condition between the gear 25 and the coupling 29 in order that the teeth 28 of the gear may be readily meshed with the teeth 30 of the coupling without clash. The resistance developed by the gear 25 being placed into tight frictional engagement with the conical member 25′ will cause the plunger 41 to be lowered against action of the coiled spring 45 this allowing the end of the extension 43 to pass from engagement with the end of the recess 49 and to pass over the inclined surface 51 to position for engagement in the rounded recess 52. In addition to the pressure of the spring 45 on the plunger 41 there will be a hydraulic pressure within the chamber 40 and as the plunger is lowered the lubricant within the chamber 40 will pass through the groove 48 to the opposite side of the enlarged lower end of the plunger and into the chamber 39. The hydraulic pressure retards the downward movement of the plunger and if an attempt should be made to operate the shift so quickly as not to allow sufficient time for synchronization the hydraulic pressure within the chamber 41 would be sufficient to hold the upper end of the plunger in engagement with the end of the recess in the shifter rod a sufficient length of time to allow for proper synchronizing. This same action increases the pressure to rock the yoke and force the gear into engagement more tightly with its associated conical member. Resistance to the movement of the operating means is increased as the speed of the movement of said operating means is increased. In other words the resistance varies according to the rate of movement of the operating means. It will be understood that the hydraulic pressure may be increased or decreased by varying the diameter of the plunger, the size of the chamber 40 in which the end of the plunger operates, or the size of the groove 48. The engagement shoulder 49a at the end of the recess 49 with the end of the extension 43 of the plunger operates to restrain the shifting of the shift rod to allow time for synchronization and as just described the dash pot effect of chamber 40 and plunger 41 further augments this restraint for controlling the synchronizing time element as desired. It will be understood that the hydraulic pressure developed in the chamber 40 will vary with the viscosity of the transmission oil therein and inasmuch as the viscosity of the oil varies from time to time due to changes in temperature the retarding effect on the depression of the plunger 41 will be increased as the viscosity of the oil increases so that, as for example in cold weather, the transmission oil becomes heavy and consequently a greater power is necessary to synchronize the gears. The hydraulic action will furnish means for allowing more time for synchronization as well as increasing the synchronizing effect. As the extension 43 of the plunger passes from engagement with the end of the recess 49 the coiled spring 55 tends to draw the yoke towards its original or normal position against the stop 90 and this movement removes the restraint on the shifter rod 32 and allows the latter to be accelerated to move the coupling member 29 into engaging position with the teeth 28 of the gear 25 this movement being further augmented by the end of the extension 43 of the plunger bearing against the inclined surface 51. The engagement of the extension in the rounded recess 52 holds the shifter rod in its shifted position. In the event that the teeth of the coupling member 29 abut the internal teeth 28 of the gear 25 said gear 25 will be jarred free of or disengaged from its engagement with the conical member 25′ so as to allow the gear 25 to have a slight rotary movement in order that the teeth 28 thereof may be meshed with the teeth 30 of the coupling member 29.

The angle of the conical member 25' and its corresponding or cooperating gear 25 is such that when these two parts are brought into tight frictional engagement they will continue to transmit a substantially normal amount of torque without the aid of axial pressure from the yoke 35 tending to hold them in tight frictional engagement while at the same time the gear 25 can be released from frictional engagement with the conical member 25' by the normal amount of axial pressure produced by the spring 55 when augmented by a slight blow from the coupling member 29. What has been said relative to the angle of the conical member 25' and its associated gear 25 is applicable to the conical member 13 and its associated member 10 formed on the inner end of the shaft 2.

In going from "second" gear to "high" gear it will be understood that the shifter rod 32 will be moved in the opposite direction and operate the yoke 34, and its associated parts in the same manner as has been described in operating the yoke 35, the yoke 34 being rocked through engagement of the extension 43 of the plunger 41 of that yoke with the shoulder 50a at the end of the recess 50. When the yoke 34 is operated the enlarged recessed end 10 of the shaft 2 is drawn into frictional engagement with the conical member 13 thereby synchronizing the speed of said enlarged recessed end with the speed of the coupling member 29 so that the teeth 30 of said coupling member may be meshed with the teeth 11 of the enlarged end 10, the shifter rod being held in its shifted position by engagement of the end of the extension 43 in the rounded recess 54.

When the coupling member is in neutral position it is spaced sufficiently far away from the members with which it is to be meshed so that before the teeth of the coupling member mesh with the teeth of the co-operating power member there is sufficient movement of the shifter rod to effect engagement of the synchronizing members, and to allow the extension 43 of the plunger carried by the yoke to pass from engagement with the end of the recess with which it is normally engaged in neutral position.

In Fig. 3 the yokes 34 and 35 are illustrated as being drawn towards one another by means of the coiled spring 55. Stop plungers 90, sliding in cylinder bores 89 within a bracket 88 formed on or secured to the casing or housing 1 stop the yokes in neutral position. The plungers are pressed outward by means of the coiled springs 91 and the outer ends of the plungers are normally in engagement with the flanges or projections 56 formed on the yokes. The upper surface of the bracket 88 is dished or recessed as shown at 93 to form a reservoir for the transmission oil. Openings 92 extend from the dished or recessed portion 93 and communicate with the recessed cylinder bores 89 so that when the plungers 90 are in their outermost positions oil will pass into the recessed cylinders 89 and form a cushion against the return of the plungers to their normal positions. This cushioning action does away with any noise incident to the return of the yokes to their normal positions.

Having fully described my invention what I claim as new and desire to secure by Letters Patent is:

1. A variable speed-ratio transmission mechanism composed of plural gear trains, at least one of which comprises intermeshable elements and another comprises both intermeshable and synchronizing elements; means for selectively coupling either of said trains including a manual control device, the operative connections between said manual control device and the synchronizing and intermeshable elements of the latter mentioned train possessing a greater mechanical advantage than the operative connections between said manual control device and the intermeshable elements of said former mentioned train.

2. A variable speed-ratio transmission mechanism composed of plural gear trains at least one of which comprises intermeshable elements and another comprises both intermeshable and synchronizing elements; said intermeshable and synchronizing elements of the latter mentioned train having a shorter range of coupling and uncoupling movement than the intermeshable elements of the former mentioned train; means for selectively coupling either of said trains including a manual control device, the operative connections between said manual control device and the synchronizing and intermeshable elements of the latter mentioned train possessing a greater mechanical advantage than the operative connections between said manual control device and the intermeshable elements of said former mentioned train.

3. A variable speed-ratio transmission mechanism composed of plural gear trains at least one of which comprises intermeshable elements and another both intermeshable and synchronizing elements; means for selectively coupling either of said trains including a manually operable shift lever, the operative connections between said lever and the synchronizing and intermeshable elements of the latter mentioned train being engageable by said lever at a point nearer the fulcrum than the point of engagement with said lever of the operative connections between said lever and the intermeshable elements of said former mentioned train.

4. A variable speed-ratio transmission mechanism composed of plural gear trains at least one of which comprises intermeshable elements and another comprises both intermeshable and synchronizing elements, said intermeshable and synchronizing elements of the latter mentioned train having a shorter range of coupling and uncoupling movement than the intermeshable elements of the former mentioned train; means for selectively coupling either of said trains including a manually operable shift lever, the operative connections between said lever and the synchronizing and intermeshable elements of the latter mentioned train being engageable by said lever at a point nearer the fulcrum than the point of engagement with said lever of the operative connections between said lever and the intermeshable elements of said former mentioned train.

5. The combination defined in claim 4 wherein the ratio of the range of coupling and uncoupling movement of the intermeshable members of the latter mentioned train to the range of movement of the intermeshable members of the former mentioned train substantially equals the ratio of the movement of the respective points of engagement of said lever with the operative connections to the respective trains whereby the handle end of said lever moves in substantially equal arcs during the operation of coupling either train.

6. A variable speed-ratio transmission mechanism composed of a power input, power output and counter shaft and plural gear trains associated with said shafts; means for coupling at least one of said trains including coacting jaw clutch elements one of which is slidable axially into and out of mesh with the other; means for coupling another of said trains comprising intermeshable gears on countershaft and power output shaft, one of which is slidable into and out of mesh with the other; means for selectively meshing said clutch elements and said gear elements including a manually operable shift lever, the operative connections between said lever and the slidable jaw clutch element being nearer the fulcrum of the lever than the operative connections between said lever and the slidable gear.

7. A variable speed-ratio transmission mechanism composed of a power input and power output member, a counter shaft and plural gear trains associated therewith; means for coupling at least one of said trains including jaw clutch elements one of which is slidable into and out of mesh with the other; means for coupling another of said trains comprising intermeshable gears one of which is slidable into and out of mesh with the other; separate shifter members operatively connected with said slidable clutch element and said slidable gear respectively; a manual control lever adapted to selectively operate each shifter member, selectively engageable means on said shifter members arranged with respect to the shifter lever in positions such that the shifter member for the slidable clutch element is engageable at a point nearer the fulcrum of the lever than the shiftable member for the slidable gear.

8. A variable speed-ratio transmission mechanism composed of a power input and power output member, a countershaft, and plural gear trains associated therewith; means for coupling said trains including pairs of intermeshable toothed elements one element of each pair being slidable into and out of mesh with the other; separate shifter members operatively connected with said slidable toothed elements, respectively; a manual control lever adapted to selectively operate each shifter member, selectively engageable means on said shifter members arranged with respect to the shifter lever in positions such that the shifter member for one slidable toothed element is engageable at a point nearer the fulcrum of the lever than the other.

In testimony whereof I affix my signature.

EARL A. THOMPSON.